(12) United States Patent
Sangle Ferriere

(10) Patent No.: US 10,643,198 B2
(45) Date of Patent: May 5, 2020

(54) METHOD AND SYSTEM FOR PERFORMING A SECURE DATA EXCHANGE

(71) Applicant: MARBEUF CONSEIL ET RECHERCHE, Paris (FR)

(72) Inventor: Bruno Sangle Ferriere, Paris (FR)

(73) Assignee: MARBEUF CONSEIL ET RECHERCHE, Paris (FR)

( * ) Notice: Subject to any disclaimer, the term of this patent is extended or adjusted under 35 U.S.C. 154(b) by 0 days.

(21) Appl. No.: 16/171,427

(22) Filed: Oct. 26, 2018

(65) Prior Publication Data

US 2019/0340596 A1  Nov. 7, 2019

(30) Foreign Application Priority Data

May 2, 2018 (FR) ...................... 18 53789

(51) Int. Cl.
*G06K 5/00* (2006.01)
*G06Q 20/32* (2012.01)
(Continued)

(52) U.S. Cl.
CPC ......... *G06Q 20/327* (2013.01); *G06Q 20/202* (2013.01); *G06Q 20/204* (2013.01);
(Continued)

(58) Field of Classification Search
CPC ........ G07F 7/1008; G07F 7/08; G06Q 20/341
(Continued)

(56) References Cited

U.S. PATENT DOCUMENTS 6,000,607 A  12/1999  Ohki et al.
6,016,957 A  1/2000  Ohki et al.
(Continued)

FOREIGN PATENT DOCUMENTS

EP  0 778 691  6/1997
GB  2 308 001 A  6/1997
WO  WO 2016/190829 A1  12/2016

OTHER PUBLICATIONS

French Preliminary Search Report dated Feb. 20, 2019 in Patent Application No. FR1853789, 9 pages (with English translation of categories of cited documents).

*Primary Examiner* — Ahshik Kim
(74) *Attorney, Agent, or Firm* — Oblon, McClelland, Maier & Neustadt, L.L.P.

(57) ABSTRACT

A method for performing at least one secure exchange within a system including first and second electronic devices (20A, 20B) and a dual reader (10) including means for connection to each of the devices and preferably a human-machine interface, and at least one server (30) to which information relating to the exchange is able to be communicated, this method including the steps of:
a) entering, into the reader (10), using its interface or an external apparatus that is connected thereto, an item of information relating to an exchange to be performed between the first and second devices (20A, 20B),
b) registering, in the first device (20A), using the reader (10), an item of information relating to the exchange,
c) registering, in the second device (20B), in particular using the reader (10), an item of information relating to the exchange, and by default canceling the exchange,
d) transmitting the data relating to said transaction to said server (30).

20 Claims, 9 Drawing Sheets

(51) Int. Cl.
   *G06Q 20/20*   (2012.01)
   *G06Q 20/34*   (2012.01)
   *G06Q 20/40*   (2012.01)
   *H04L 29/06*   (2006.01)

(52) U.S. Cl.
   CPC ....... *G06Q 20/3229* (2013.01); *G06Q 20/352* (2013.01); *G06Q 20/40145* (2013.01); *H04L 63/0442* (2013.01)

(58) Field of Classification Search
   USPC ........................................................ 235/380
   See application file for complete search history.

(56) References Cited

U.S. PATENT DOCUMENTS

| | | |
|---|---|---|
| 6,339,638 B1 | 1/2002 | Ohki et al. |
| 2013/0036017 A1 | 2/2013 | Galloway |
| 2017/0200155 A1* | 7/2017 | Fourez ............... G06Q 20/3829 |
| 2018/0032993 A1* | 2/2018 | Park ....................... G06Q 20/32 |
| 2018/0336543 A1* | 11/2018 | Van Os ................ G06Q 20/223 |
| 2018/0336553 A1* | 11/2018 | Brudnicki .............. G06Q 20/10 |
| 2019/0130482 A1* | 5/2019 | Morris ................... G06Q 40/02 |

\* cited by examiner

METHOD AND SYSTEM FOR PERFORMING A SECURE DATA EXCHANGE

The present invention relates to methods and systems for performing secure data exchanges.

PRIOR ART

Payment cards are nowadays extremely widely used for making secure payments. It is possible to debit or to credit a bank account associated with a card using a reader into which the card is inserted or to which the card is brought close to in the case of contactless communication. More often than not, this reader has to communicate with a remote server during the transaction, thereby sometimes blocking the latter if there is no network available.

Moreover, currently, when a certain sum of money has to be debited from an account associated with a payment card for the benefit of another person's account, the said other person, in order to be able to use the sum received with his payment card, more often than not has to wait for the corresponding sum to be effectively transferred.

Cash payments are thus encouraged in the absence of a network and in many situations in which people wish to be able to quickly reuse the received money, with the drawbacks associated with carrying cash, in particular the risk of loss or of counterfeit notes.

SUMMARY

There is a need to rectify all or some of these drawbacks, and more generally to find a new means for promoting financial transactions and, more generally, to securely transmit any computer file or any amount registered in at least one register linked to such a file or that is independent.

The invention aims to meet this need and does so, according to one of its aspects, by virtue of a method for performing at least one secure exchange within a system including a first and a second electronic devices and a dual reader including means for connection to each of the devices and preferably a human-machine interface and at least one server to which information relating to the exchange is able to be communicated to, this method including the steps of:

a) Possibly establishing a first secure connection to the first device using the reader, b) possibly establishing a second secure connection to the second device using the reader, c) entering, into the reader, using its interface or an external apparatus that is connected thereto, an item of information relating to an exchange to be performed between the first and second devices, d) registering, in the first device, using the reader, an item of information relating to the exchange, e) registering, in the second device, in particular using the reader, an item of information relating to the exchange, and by default canceling the exchange, f) possibly confirming in the first device, in particular using the reader, an item of information relating to the exchange, g) transmitting the data relating to said transaction to said server.

'Exchange' should be understood to mean a transfer or a copying, between the two devices, of a computer file or of one or more amounts registered in one or more registers of said devices, this transfer then being able to be partial or total. This exchange may correspond to an exchange or transfer of documents, but also to a payment or any other financial or non-financial transaction.

There are preferably a plurality of servers. Hereinafter, that which is described for a server is also applicable when there are a plurality of servers.

The method preferably includes steps a) and/or b). The first and/or second devices may communicate information to the reader, in particular information relating to an inventory of the documents recorded in the devices, so that the reader is able to incorporate them into a menu.

Steps a) and b) may be omitted in particular if the list of the files and amounts able to be transferred is known to the reader independently of the electronic devices, for example if the system is restricted to the transfer of certain types of file or amounts or if the user is able to assume that said files or amounts are present on the electronic devices.

If, in step e), the registration is not able to take place, then the dual reader will detect this, for example having waited for a time that is parameterized in the system, such as 1 minute for example, without having been presented with a second electronic device. It will then cancel the transaction, step which will be transmitted to the first electronic device if the latter is connected to the dual reader or brought close to the dual reader again, or else if thereafter, by way of another dual reader and of the server, the second electronic device is synchronized with the server after the first dual reader has transmitted, directly or indirectly, the item of cancelation information to the server. The dual reader may also register the item of cancelation information on other electronic devices without impacting them other than in terms of them being used as an information vector, this item of cancelation information being able to be passed to the servers when they are used later. Thus, the validity of the registration on the first device is conditional upon the registration, on the second device, of the item of information relating to the exchange; the validity of the registration on the first device may be communicated, after the registration on the second device, to the first device by way of the dual reader, or subsequently by way of the server and then of another dual reader.

The method preferably includes step f).

If step f) is omitted when the first device is the receiver of a file or of a certain sum representing some or all of an amount registered in a register, said first device will be credited with said file or with said sum upon a subsequent connection to the same dual reader, or by way of a connection to the server and of the same or other dual readers. Lastly, if the first device is inserted into the dual reader, steps a), d) and f) may be performed automatically, without the need for manual intervention.

Step g) may take place just after the transaction, for example within less than 5 minutes, or a longer time thereafter.

If step g) does not take place just after the transaction, the information relating to the exchange may be communicated to the server through the dual readers, which will thereafter enter into communication with the second electronic device, or with the first or the second electronic device if step f) has taken place, or with an electronic device to which the file or another sum resulting from the amount debited from the first device will have been transferred subsequently.

'Dual reader' is understood to mean a reader capable of implementing the invention and therefore of simultaneously and/or successively exchanging with two electronic devices according to the invention.

Whether the secure exchange is a financial transaction or the transmission of a simple file, by virtue of the dual reader and according to the invention, it is not necessary to connect to a remote server at the time of the transaction, thereby making the latter easier and at the same time allowing a secure transaction.

Transaction

'Transaction' should be understood to mean the transmission of an electronic file or of one or more sums resulting from amounts registered in registers linked to the said file, or that are independent.

The transaction may consist of a transfer from one electronic device to the other, with deletion of the file or adjustment of the amount transferred from the electronic device that is the source of the transferred sum, or simply a communication of a file or of amounts linked to the file, or that are independent, for consultation by the dual reader, by a server or else by another electronic device connected to the reader, the file or the amount then remaining on the electronic device where it is present at the start and its communication to the second electronic device possibly having the sole aim of allowing the latter to get the corresponding information.

The file or the amounts may represent a number of points, or a document to be presented in certain circumstances, in the event of verification, such as an identity or discount card, or a transport pass. In this case, the file may or may not be retained on the electronic device at the end of the transaction for another verification. It may also be a document having or not having an expiry date, such as a discount coupon, an access pass to ski lifts or to other equipment or facilities, an audio or video recording, a book or something else that is for example borrowed, loaned or purchased.

It may also be an item of confidential information, for instance a login and password associated to a web-site or a user license that may or may not need PIN or a key required for the decryption of a single file, or biometric accreditation file such as a fingerprint scan, the reading of a physical measurement made by a medical sensor associated to a reader and placed inside or outside a human body, the reading of a physical measurement made by a sensor associated to the reader of some commodity usage such as electricity, water or gas, the reading of a physical measurement made by a sensor associated to the reader of the state of a vehicle such as its size, position, speed and to be communicated safely to another vehicle for instance, an electronic key or a memo needing biometric accreditation or the entering of a code, such as a password, in order to be decrypted or transferred. The reader may contain some functionality to use files containing some cryptographic keys to verify some electronic signatures or decrypt or encrypt documents with such cryptographic key. Such reader connected to a PC screen may decrypt or verify the signature of some files to be displayed by such screen, based on cryptographic keys placed as a documents on the electronic device; connected to a keyboard the reader may encrypt or sign some text typed on it before being sent onto the screen and later through the internet. It may be money, but the invention also covers the exchange of stocks to the bearer, of $CO_2$ emission rights, or of any type of bonus or penalty, for example points awarded in an exam, during a game, or certain attributes of an official document, such as driving license points.

The files may also be marked to be restricted not to be displayed by the reader or not to be copied on any device connected to the reader, or to have such actions limited in time or quantity therefore allowing for instance secure storage of user information, the system storing the information as required by law but not allowing such information to be transferred out, or to be transferred out in large quantities.

The files may be marked as 'copy allowed' with possibly the number of allowed copies set and also whether copies of copies and the depth of such copies to be allowed. By Copy it is meant a copy of the file made within the system. Such copies may be marked as copies or copies of copies potentially up to a certain depth and have the depth of the copy recoded with it. This would allow for instance for an official document such as an ID card to be copied and its copy to be transferred to another secure device.

The files may be editable when they are marked as such and the quantity attached to them equals the maximum quantity allowed on the file. This function would allow for instance the automatic creation of receipts, or the plain storage capacity for files that can then benefit from the security capabilities of the system such as, for instance, not to be able to be duplicated within the system or not to be displayed outside the system.

The files may be associated together into a group so that the transfer of one file may only be processed with the transfer of the other files with which it has been associated. In such case the readers of other devices may not allow the transfer from a device of files members of groups if such transfer would make the quantity associated to such files too small for all the groups of files of which such file is a member, to be transferrable. This functionality will for example allow for groups of files to be prepared by the users so that he can then transfer them out to another device promptly. The joining of file in groups may also be marked as 'Strong' so that a file joined strongly to a group on a particular device can only be removed from such group if both the file is marked to be allowed to be removed and if the removal takes place on the same device on which the file joined the group. The first file joining the group may also be made as unable to leave the group, so that any file joining a group that started with this file would be linked to such first file and not specifically to any other file that may have joined the group later. This functionality would for instance allow the signature of some documents where for instance a user would add a copy of his ID to a group of files containing the document he wishes to endorse without leaving the possibility for other users to remove such copy of his ID.

A further functionality could allow to seal such group of files, removing the ability for a group of files to be dismantled by having some of its elements removed, even on the device from which they joined the group. This functionality could be implemented for instance by marking the first file joining the group as 'Sealabe', and allowing the user of the device on which this file was marked as Sealable to Seal the groups of files it became part of, disallowing the possibility of such group of files to lose some of its members, or eventually to be able to get any new member. This functionality would for instance allow for the safe keeping of the endorsement of documents that would be endorsed by individuals who would have agreed, potentially irreversibly, to put a copy of their ID on a group of files containing the document. Some file may be marked not to be able to be ever sealed to a group, or to be allowed to leave a group whatever happens to that group, so as for instance not allowing files representing money not to be exchanged freely if they permanently become attached to a group. The files attached to a sealed group may also be used to prevent the transfer of such group of files unless a file derived from a template included in the sealed group, or the original of the copy of a document placed inside the sealed group is present on the device it is meant to be transferred to. This would allow for instance to restrict the movements or the distribution of some documents to devices that would for instance bear a valid membership card.

Each electronic device is associated with an account that is managed by one or more servers external to the dual reader.

The server(s) record all of the transactions linked to the account, but also the files and amounts registered in the registers of the electronic devices. These transactions are reported to them at the time of the transactions, or subsequently. The operations assigning a file or an amount are confirmed by the servers and registered as such on them as soon as the servers know all of the transactions that link a file or an amount that are transferred to an electronic device that contained the 'initial' file or amounts, these themselves being registered and confirmed beforehand by the servers following other transactions or modified by an external application authorized to do so; this makes it possible to ensure firstly that each transaction debits or credits an account just once, and secondly that any crediting of an account by an amount is compensated for by debiting of another account by such amount if the transaction corresponds to a transfer and not to a consultation. For example, if an electronic device A transmits a file or an amount to an electronic device B that transmits it to an electronic device C, the presence of the file or the value of the amount registered on the electronic device C will not be confirmed by the servers before said servers have been informed of the two transactions: from A to B and from B to C (chaining). This information process may be implemented when the electronic device bearing the last transaction is synchronized, the intermediate transactions being registered on it during that last transaction. The files and amounts may also be updated through the intervention of a computer system external to the system and authorized to perform this operation. For example, the computer system of a company that issues discount cards may connect to the servers in order to deposit a file corresponding to one of its discount cards on the account of an electronic device. The servers will communicate this file to the electronic device in question when they connect to the electronic device, through a dual reader that is itself connected to the servers.

A transaction may be subject to certain constraints, depending for example on the nature of what is transferred; thus, an amount may be constrained so as to vary within a predefined range of values, with a possibility of varying by predefined increments where applicable. Typically, a currency account will have a balance that will vary with an increment that is a multiple of hundredths of units, a minimum of 0 and a set maximum. The dual reader may thus perform the transfer of amounts registered in a register of a first electronic device from or to the register of other electronic devices while ensuring that, at the end of each transfer, certain rules present in the dual readers at the time of the transfer are complied with for each of the initial values of the said registers incremented by the amounts received or from which values the amounts sent have been deducted; these rules may in particular be those of remaining above or equal to zero and below a maximum. The system may be designed to associate an amount with any file that otherwise may not be associated with any amount, assign it an increment of 1, a minimum of zero and a maximum of 1; the system may thus allow the file to be transmitted while at the same time ensuring that said file is only present at any time on just one of the electronic devices of the system, using the confirmation procedures designed for the transfer of amounts.

The authenticity on an electronic device of a file or of an amount forming the subject of transactions is preferably ensured by the fact that this file or this amount may be made unavailable on an electronic device as soon as said file or amount is transferred to another electronic device, or as soon as, if the transaction is partial, the sum transferred from the amount from a first electronic device to a second one is subtracted from the amount of the first device before or at the same time as it is added to the amount registered in the register of the second electronic device; in addition, a verification may be installed so that this transferred sum is not greater than the amount initially registered in the register of the first electronic device.

It is possible for example to ensure that the subject of the transfer is formed of virtual notes with a value, of which the total of the amounts through the system corresponds to a balance in a bank account. The file may represent a virtual currency, and the amount may represent the value of the note. The transaction may be performed on these virtual notes. The holder of the bank account issuing these virtual notes may, through his external application, authorize the system to increase the amount associated with the file of an electronic device by a certain sum against a credit of the same sum, but in actual currency in said bank account, by the holder of the electronic device; and, by contrast, will credit the bank account of a third person against the debiting of the amount associated with said virtual notes, registered on an electronic device held by the third person. To transfer a sum of money from a first electronic device to a second one, a user may transfer all or some of the amount associated with this virtual note present on his electronic device along with the computer file associated with this virtual note—if it is not already there—to a second device. Preferably, the issuer of the virtual notes will credit the bank account of the third person only if the amount to be debited has been confirmed by the servers.

One and the same electronic device may be configured to perform transactions that relate at the same time and conditionally to different files and amounts. For example, a file and an amount of the electronic device stores a number of transport tickets available on the device, whereas another file and another amount stores a sum of money available on the device.

The files and amounts (electronic files and/or associated amounts registered in the registers) may originate from and be updated, through the servers, by an external third-party application, belonging for example to a company issuing the file or the registered amount, such as a transport pass seller or a bank.

The issuer may assign, to the files or amounts that it issues, information that allows a certain fungibility with virtual notes issued by other banks; the dual reader is then authorized to display the total sum of the amounts associated with the same currency and to receive overall transfer instructions regarding this currency, such that the user does not have to mention the issuing banks linked to the virtual notes, the dual reader taking responsibility for breaking down each overall transfer into transfers corresponding to the various virtual notes that are present on the electronic device that is debited.

The transaction between the two electronic devices via the dual reader may take place without connection to a remote server. However, it is possible, in particular to ensure immediate synchronization, with the servers, of the operations that are performed and/or verification, to connect the dual reader to the servers during the transaction. In this case, the dual reader may be connected to a cellular data network such as 3G, or to an external apparatus, for example a microcomputer, a telephone or a dedicated terminal, that is connected to the Internet. To perform a transaction with an external third-party application, the user may therefore use an external apparatus connected to the dual reader and by virtue of which he is able to choose the one of the two electronic devices linked to the dual reader with which he wishes to interact, and also select the file and/or the possible amount that he wishes to send or receive.

Before each transaction, an 'available' amount equal to the recorded amount plus credit transactions and minus previous debit transactions may be calculated, and any transaction aimed at debiting this account beyond this available balance may be denied. A 'definitely available' amount may also be calculated, corresponding to the amount minus previous debit transactions from this same amount. This calculated amount may be termed definite insofar as it does not take into account credit transactions that have not yet been confirmed by the servers.

The dual reader may generate transactions by recording them on each of the electronic devices that are debited or credited and by copying, where applicable, the file that is the subject of the transfer to the credited device if it is not already there.

The dual reader, to perform a transfer of amounts, may break this transfer down into sub-transfers that are associated with the amount present on the electronic device,
or with credits written to the latter and originating from previous transactions, while at the same time verifying, for each debited sub-element, amount or previous transaction, that the debited sum does not exceed the definitely available amount, or for the previous transactions, the sum of the initial credit transaction minus the sums of the debit transactions that may have been associated therewith in the past.

It is possible to provide functionalities aimed at limiting the transactions; for example impose a maximum limit on the amount or on the transferred amount.

The transactions, files and amounts registered on the electronic devices may be communicated to the servers upon each sufficiently long connection thereto via the Internet.

The dual readers may serve as relays for informing the servers which list the transactions originating from electronic devices with which they will have communicated, but without necessarily having generated the said transactions.

During or after connection of an electronic device to a server, the latter may, in a one-off manner, confirm the transactions and calculate new files and amounts for the device, along with:

a list of transactions that may be deleted upon the next connection of the device,
a list of transactions that have to be added thereto or that have to be deleted when the balance is being updated,
a list of transactions reported to the servers by other electronic devices and readers but that are not yet present on the electronic device in question, in particular if a transaction has created a debit on an electronic device but the corresponding credit transaction has not been communicated to the credited device, for example if its user has neglected to place his card next to the reader a final time during the operation, or if the debit transaction with an unknown counterpart denoted on the card has not been able to be replaced by the same transaction but including the identifier of the counterpart.

Upon a new connection of the device or during the same connection if this lasts long enough, the actions linked to each of these lists mentioned above, and also the possible updating of the files and amounts, may be performed.

The system may be configured so that, when necessary, the updates to certain transactions and to certain amounts and files are simultaneous. For example, if the update involves incorporating, into an amount, a transaction representing an addition of 1, this transaction will be deleted from the device at the same time as the register containing the amount is incremented by 1.

Electronic Device

The electronic device according to the invention is preferably compatible with existing payment terminals.

Preferably, the electronic device is in the standardized format of a credit card, as defined by the standard ISO 7810. As a variant, it may be a mobile telephone or a SIM card able to be inserted into a mobile telephone.

When it is in the form of a card, the device advantageously has a chip equipped with a connector allowing it to be inserted into the dual reader and to communicate therewith.

The electronic device may also be equipped with a system for communicating with the dual reader via a contactless link, for example an RFID system.

The electronic device may contain a protected private key and a memory, for example flash memory encrypted using the private key of the device, and possibly a processor. The memory containing the private key is preferably physically protected so that physically accessing it leads to destruction thereof before the information that it contains is extracted therefrom. The holder of the device is no longer able to use it and will have to contact the operator of a central server who, if he is able to identify the electronic device and has appropriate procedures suitable for using the system, may possibly recover, from the server, files and amounts present on the electronic device and put them onto a new electronic device.

The electronic device may include an electric power source, for example a battery, an induction system, or a capacitor, supercapacitor or accumulator battery, which is recharged upon connection to a reader or otherwise. The device may also include some sensors such as for instance temperature, pressure, positioning and may have an ability to create some documents that would use these sensors.

The electronic device may possibly have an interface allowing direct unidirectional or bidirectional communication with a remote server, for example through the use of a low energy consumption wireless network such as BLE (Bluetooth Low Energy), Sigfox, Lora, 4G LTE, etc. This communication with the server may be used, when it is available, to speed up the synchronization of the data between the electronic device and the server.

The electronic device may be configured to perform all or some of the following operations:

verify, before any communication with the reader, that said reader forms part of the authorized readers,
accept only encrypted information for which it is the intended recipient,
encrypt and sign any outgoing item of information intended for a reader or for a server.

The information recorded on the electronic device may be all or some of the following information:

Copy of the computer files and of the amounts,
log of the latest transactions that are not yet authenticated by the server(s), list of the transactions performed by the device with other electronic devices, which transactions are not yet recorded on the remote servers, allowing the servers to chain each transaction on the device to an amount or a file of another electronic device, even if these transactions have moreover not been communicated to the servers, PIN code for possibly authorizing the transactions when the electronic device is inserted into the dual reader or communicates therewith in another way, identifier number of the electronic device, private key of the electronic device that is unavailable outside of said device.

list of public keys of the dual readers and of the servers, and potentially unique private keys associated to every single server or dual reader with which it may communicate and to be used to identify itself with such server or dual reader.

It is also possible to record, within the electronic device, for each file and amount or type of file and type of amount, a minimum, a maximum and an authorized increment, and also possible rules for constraining the transfer thereof.

Dual Reader

The dual reader, which may also be called 'reader', is configured to establish a secure connection to the electronic devices according to the invention in order to perform a transaction. It thus has means for communicating with these electronic devices.

This connection may involve physical contact between each of the electronic devices and the dual reader. As a variant, this connection may be made contactlessly, via a radio link, in particular of NFC type. The dual readers may be configured so as to be able to allow secure exchanges with the electronic devices in different locations through two dual readers that are linked by a computer connection. It will then be possible possibly to restrict this type of use to cases where one of the electronic devices has an owner whose identity will be revealed to the holder of the second electronic device before the latter makes the transaction.

The dual reader may have the option of being controlled by a computer, a telephone or an electronic system designed for this purpose. This may be useful in particular if the computer or the telephone performs the function of a cash register, an ATM, or of a train ticket seller, for example. The dual readers may include some sensors the reading of which being used in the creation of documents. The dual reader may also be connected to some peripherals that may be for instance sensors the reading of which may be used when creating documents, or biometric devices, the reading of which may be used to carry biometric accreditation for the reader. The dual reader may include some ability to generate automatically documents and place them on one of the electronic devices it is connected to; such automatically generated document could be for instance a physical measurement such as the measurement for instance of a position or temperature or the concentration of a molecule within a liquid. The dual reader may also incorporate one of the electronic devices, the functionality of the incorporated electronic device being able to remain in operation when the 'dual reader' functionality is turned off.

In one exemplary implementation of the invention, one of the electronic devices is a card that is inserted into a card reader corresponding to the dual reader; the connection to the other electronic device, which may also be a card, may be made contactlessly, whereas the first card is held in the reader. Therefore, in this example, the first connection is contact-based and the second one is contactless.

The dual reader may be configured to allow the simultaneous exchange of information with the two electronic devices when these are connected thereto, through contact or contactlessly.

As a variant, the exchange of information is asynchronous, and the dual reader is configured to exchange information with just a single electronic device at a time; in this case, successive connections are made to the electronic devices in order to perform the transaction.

The dual reader may be configured to connect to an external server, while a transaction is being performed between two electronic devices, or outside of such a transaction.

The dual reader may take the form of a payment terminal such as those used nowadays to make a payment using a bank card in a shop, or else take the form of a reader having a keypad similar to the personal card readers used to accredit a connection to a banking interface but that allows entry of information relating to the exchange. The dual reader may have both a contact-based card reader and a contactless card reader, in particular of NFC type.

The dual reader may have an interface allowing it to be connected to a computer network, for example the Internet, via a 3G, 4G, 5G or Wi-Fi network, where applicable via a computer or a telephone. The human-machine interface of the dual reader may include a keypad, preferably with buttons, and at least one screen; the system then makes it possible to display two messages intended for the bearers of the first and second devices, respectively.

As a variant, the human-machine interface of the dual reader includes a voice interface. The interface of the dual reader may also include means for identifying the holders of the electronic devices, such as the option of entering a PIN code or a biometric system, which may, after taking into account documents identifying said holders and borne by said electronic devices, confirm the credentials of an electronic device and of its holder.

The human-machine interface of the dual reader may make it possible to:

confirm the connection to an electronic device that is inserted into the reader or that is connected thereto in another way, possibly select the file or the amount to be transferred, possibly enter an amount relating to the transaction, for example a sum of money to be transferred, and indicate whether this involves sending or receiving for the corresponding electronic device, display messages possibly back-to-back for respective users of the two electronic devices, allow the users to display the balance and/or one or more amounts, which are or are not associated with a file, of their electronic devices, allow the PIN code to be changed, possibly allow the content of a file to be changed if this is authorized for this file, possibly allow the creation of files and of associated amounts.

The human-machine interface may make it possible to display one or more amounts associated with the transfer before confirmation of the transaction; the file relating to the transaction may also be displayed or read, in particular if it is an audio or video file; instructions for the users may also be displayed or read.

Where applicable, the human-machine interface is deported to another apparatus with which the dual reader communicates via a wired or wireless link, such as for example a computer, a cash register, an electronic lock or a mobile telephone.

The dual reader preferably has means necessary for performing the transactions described above, and therefore for signing messages with the computer key that identifies it, the ability to calculate available amounts and in particular definitely available amounts, for creating messages representing for example transactions or instructions that will be registered in the electronic devices, and means allowing the servers to write, read and delete, at will, to and from the electronic devices, amounts registered in registers, transactions and lists of authorized readers.

The dual reader preferably has all or some of the following elements:

a connection for wired linking to a microcomputer or other terminal, for example of USB type, a wireless connection to a microcomputer or telephone, for example of Bluetooth type, a wireless connection for establishing a link to an electronic device according to the invention, for example of Bluetooth or RFID type, a contact-based connector for communicating with an electronic device according to the invention if the latter is inserted into the reader, an internal clock synchronized upon each connection to the server and allowing the transactions and balances to be timestamped, this clock preferably being accurate, for example to within +/−5 seconds per month, a physically protected memory containing the private key of the dual reader and the physical accessing of which preferably leads to destruction thereof before the information that it contains is able to be copied therefrom, at least one memory the content of which is encrypted by its own private key and in which all or some of the following information may be stored:

a code identifying the dual reader, a list of the latest transactions performed via the dual reader and of the corresponding files, a buffer list of transactions performed by other readers, of fraudulent transactions or balances or any other item of data that servers wish to communicate to electronic devices or that electronic devices wish to communicate to the servers, the lists of shared or public keys of the servers and electronic devices and also possibly of private keys, each associated to a server or an electronic device and to be used to communicate and identify itself with such server or electronic device.

The dual reader may be configured to perform all or some of the following operations:

Read a PIN code and an identifier of the electronic device that is connected thereto, calculate available amounts, delete, write or retain transactions, have the electronic device that is connected thereto sign messages, update, on the electronic device, lists of authorized readers and servers, depending on the security system that is adopted.

Another subject of the invention is the dual reader considered as such.

Servers

These are remote computer systems that contain accounts associated with each electronic device and dual reader on the basis of the transactions performed by the associated electronic devices, or on the basis of instructions originating from an authorized external application that may add or remove files and modify amounts.

The server(s) include at least one memory in which all or some of the following information may be stored:
1. for each electronic device;
   a copy of the transactions that have not yet given rise, on this device, to a change in the amount or in the file to which the transaction relates, and their associated files, another copy being recorded on the corresponding electronic device; each transaction that will have been confirmed by the server will be marked as such;
   amounts and files recorded on the electronic devices;
   information for identifying the lists of keys present on the electronic device;
2. for each dual reader
   information for identifying the lists of keys present on the dual reader.
3. private key of the server, preferably physically protected, or a list of private keys, preferably physically protected, each of these keys being used to identify itself with some individual devices or individual dual readers or groups of such, together with their associated public keys.
4. list of the public keys of the dual readers,
5. list of the public keys of the electronic devices,
6. list of the public keys of the other servers.

The servers communicate with one another and may for example distribute among themselves the information by electronic device and by dual reader; this may make it possible to retain the information relating to a particular dual reader or to a particular electronic device on a particular server; this may also allow the server to which any dual reader connects to read and change or modify this information when this is necessary. The system may include just one server, thus reducing the complexity of the system.

The servers may be configured to deny any transaction aimed at debiting an amount by a sum that is greater than said amount and mark such a transaction as fraudulent; this item of information may be communicated to the electronic device upon the next connection. The transaction marked as fraudulent will then no longer be taken into account. Transactions depending on fraudulent transactions may also be canceled or marked as fraudulent.

The servers may mark transactions as valid in particular as soon as the following verifications have been made:
that they relate to electronic devices and dual readers that are valid during said transaction;
either that they debit an amount originating from a transaction that has itself been confirmed by the servers before this verification, or that they debit amounts or files registered beforehand by the servers on an electronic device, or that they debit files created ex nihilo using a dual reader and that have not yet been transmitted;
that they comply with the rules imposed upon such a transaction at the time of this transaction, such as for example:
the impossibility of debiting an amount registered in a register by a sum that is greater than said amount if this rule is applicable to this amount;
the impossibility of debiting a sum greater than an amount registered in the register of an electronic device adjusted by sums of other transactions before the verified transaction and that would debit from this sum, if this rule is applicable to this amount;
the impossibility of making the transaction if other linked transactions are not performed at the same time and that these transactions have not all been performed, one of these linked transactions being able for example to require biometric verification.

The information regarding the transactions may include information relating to the amount present in the credited electronic device, which information could be necessary for the servers to confirm the transaction.

The servers may be configured to calculate and update an amount only if they have knowledge of all of the transactions marked as confirmed from device to device and that link each credit to a debit of an already confirmed amount. In this way, no transaction originating from a reader or from an electronic device that is not registered in the servers is able to give rise to variations in amounts. Moreover, this will allow the servers to credit amounts to the electronic devices on the basis of the same transactions that are linked to debits on other electronic devices, thus ensuring continuity, throughout all of the electronic devices, of the total value of the amounts, adjusted by all of the transactions that are confirmed but not yet taken into account by the amounts registered on the electronic devices. The servers may also be configured to calculate and update the amounts debited and credited by one and the same transaction simultaneously. The servers will then keep in memory firstly the amount registered on the electronic device and secondly the amount updated by the server but not yet registered on said electronic device, linked to which amount will be the transaction that will have been used for the update and that will have to be deleted from said electronic device when the newly calculated amount is copied to said device.

To facilitate this chaining, the electronic devices may contain a copy of the other transactions that have been performed before the debit of an amount or of a file, these transactions making it possible to link this debit to initial files or amounts that are already confirmed by the servers, as long as these transactions have not been reported to the servers in another way.

During a transaction with an external entity, the servers may begin by calculating the amount in question, taking into account all of the transactions applied to said amount present on the device.

To modify a document represented by a file or an amount registered in a register of the electronic device, if the electronic device contains transactions regarding this document that have not yet been confirmed by the server, the dual reader may follow the procedure below provided for transactions with an external entity and therefore requiring synchronization with the server, and then authorize and implement the modification of said file or of the amount on the electronic device. The device may also restrict the file modifications to the files having just one register in which an amount is able to be registered and in which this amount would be constrained to be only 0 or 1.

As the servers are accessible by connection to a data network, they may allow data synchronization of at least one of the electronic devices with said servers, via a computer or a telephone. An exemplary synchronization process is described further on with reference to FIG. 4.

The system for implementing the invention may include several private keys per server, which will be used indiscriminately if this is necessary, so that each server is able to respond quickly to the dual readers and to the electronic devices.

In one exemplary implementation of the invention, the electronic devices including SIM chip cards and an RFID connection, the system is configured to allow transactions involving two dual readers that are remote from one another. The system may then note, in the recording of the transaction, the identifiers of each of the two readers. A mechanism for pairing of the two readers may be organized. This mechanism may include a means for displaying the identity of the holder of the remote electronic device and may also restrict the transactions to transactions in which at least one of the electronic devices involved has an identifiable holder. The pairing mechanism may also include a means for one or for each of the two paired readers to indicate the location where the other reader is located.

Security of the Files and Amounts

'Secure' is intended to mean that information is not able to flow or be modified in the system outside of the procedures specific thereto and is not able to leave it or enter it without authorization from the user in accordance with the procedures of the system, which may depend on the type of each document.

The data present in the electronic devices according to the invention and the readers or servers are preferably secure: These data registered in memory are able to be interpreted only in the presence of the electronic device or of the dual reader that bears them, for example through encryption using a key residing in this electronic device or dual reader.

Mechanisms for protecting the software borne by the electronic devices and dual readers are preferably present, so as to avoid fraudulent software from being introduced thereinto. This software may be signed and its signature verified when it is loaded. These signatures may also be verified before any transaction. The software may also be made different to each particular element of the system, for example by adding to its code a reference to the ID of the element of the system it is meant to run on, so that the hacking or the compromising of one software does not compromise many or all elements of the system, but only the one or the ones it is meant to run on. By hacking or compromising of the software, it is meant the ability to replace such software with a different one without the element of the system on which it is meant to run being able to notice such replacement. For instance techniques used to secure files have been using methods knowns as 'Hashing', some of such methods, such as MD5, having been reported at some point not to be perfectly secure.

Preferably, all of the communications between the various elements of the system are performed such that they are comprehensible only to the elements of the system and are not able to originate from third-party elements outside of the systems accredited for this purpose and linked to the servers, or controlling the dual reader instead of a user.

Each element of the system, i.e. each server, dual reader or electronic device, may have a private key that only it knows, but the public key of which is associated with its identifier. Each element of the system may also have a private key dedicated to each other element of the system, the hacking of any such private key compromising only the security of the communication with the device it was associated with and not of the communication with all the devices in the same category.

Advantageously, none of these private keys, be this of the servers, of each dual reader or of each electronic device, ever leaves its carrier, and is advantageously physically protected by an appropriate electronic technology.

A mechanism may be provided for allowing the keys of the servers and of each dual reader to be renewed.

Detection of Fraud

As the dual reader includes a clock, the information registered in the first and second devices will be time-stamped with the time of the exchange.

The server may cancel transactions recorded on the electronic devices if the chaining of the transactions to any transaction gives rise to any rule associated with the transaction and parameterized in the server(s) not being complied with.

Preferably, the transactions are deleted from the dual readers only after they have been reported to the servers. The dual readers will advantageously have a light or other indicator showing that they are incapable of operating for new transactions if their whole memory is being used.

Any anomaly, for example chaining, signature or date anomaly, is preferably marked as fraudulent.

Any balance, any transaction, any list detected as fraudulent, for example bearing a fraudulent signature, is reported to the servers and marked as invalid.

Handling Fraud

The servers may be configured to detect fraud and mark any transaction, list, balance or electronic device as fraudulent.

Their invalidation and possible rectification is transmitted to the electronic device.

An electronic device or reader may be marked as fraudulent, made inoperative, struck from the list of authorized electronic devices or dual readers, and marked as such. A list of the fraudulent electronic devices may be communicated to the dual readers so that said readers deactivate fraudulent electronic devices that may connect thereto.

Transactions made using known fraudulent readers and not yet validated may be not validated by the server until a reasonable time set in the server has elapsed from the moment they were made; such transactions may also be marked as suspicious on the devices and be prevented from being subject to transactions themselves, until the said reasonable time has elapsed or until these transactions are effectively validated by the server.

Data Integrity

Certain operations of registering amounts and transactions or other operations have to be coherent with respect to one another. Converting transactions by modifying amounts or files is not able to be achieved without the two elements, that is to say the transactions and the amount or the file, being updated or deleted together. A process may be used to ensure that update blocks of the electronic device are confirmed only when these information blocks have been correctly registered in full. It is possible for example to assign a reference to the information in these write blocks, this reference being marked as valid only when all of the elements of the block have been written correctly. To delete superfluous information, it is possible in the same way to register referenced deletion instructions, a procedure that will thereafter actually delete these superfluous information.

Security of the Communications

Various techniques may ensure the security of the communications between the various servers, electronic devices and dual readers. The following description is not intended to be exhaustive, but only illustrative of techniques allowing for such security.

Security by Lists

Each element of the system, that is to say each server, each dual reader and each electronic device, may have a or multiple private keys that are not duplicated anywhere but the corresponding public key of which is known to the system and compiled in a list. If a server, dual reader has multiple private keys, some or all of these private keys may be associated to specific or groups of other servers, readers or devices and their corresponding public keys will be known by the specific or groups of such other servers, readers or devices they are associated with. This keys may be the same as or different from the private key associated in any event with any element of the system (servers, electronic devices and dual readers) and used to update its software, to update itself and to encrypt data within its memory.

These lists are therefore lists of public keys associated with each element. There is thus a list of the public keys of the servers, a list of the public keys of the readers, and a list of the public keys of the electronic devices, such lists in case of multiple private keys having the information of the other specific or groups of other servers, readers or devices they are associated with.

The servers retain each of these lists, as do the dual readers; the electronic devices all have the list of the public keys of the servers and of the public keys of the dual readers.

The lists are updated when the elements of the system are connected for a long enough time (dual reader to servers, electronic device to reader, or electronic device to servers).

Any sending of data is performed only to an element listed in one of these lists, and encrypted so that only the intended recipient element is able to read it, and signed so that the intended recipient is able to verify the authenticity of the sender of the message.

The system may allow, on request of the server, the private keys and their associated public keys to be renewed.

With this system, it is possible to ensure that each electronic device communicates with just one reader or one server of the same system. Likewise, it is possible to ensure that each reader communicates with just one server or one electronic device of the system, and does so in an encrypted manner.

Security by lists has the drawback of requiring significant saving and updating of the lists on each electronic device and reader, but has the advantage firstly of making it possible to defend against theft of the private keys, these being situated physically on each hardware carrier and not being designed to leave it, thereby involving the securing of a smaller number of technologies, and secondly of ensuring multiplicity thereof, the theft of a key impacting a reader or an electronic device compromising only this reader or electronic device. The use of multiple private keys may mitigate the impact of hacking of such key, the compromising of a key affecting a lesser number of servers, readers and devices; for instance a compromised server key, part of a multiple private keys system will only make unsecure the other elements of the system such compromise private key is associated with. The private keys may also be updated some time to time or upon suspicion of their hacking, so that elements of the system aware of the latest corresponding public key may not communicate with an element that fakes to be part of the system but in fact is not as it will not process the new private key, but only one of the older keys.

Security by Shared Keys

The lists of keys of the electronic devices, or list of the keys of the dual readers or list of the keys of the servers, may each be replaced by small lists of shared keys of dual readers, of electronic devices or of servers. These keys are said to be shared insofar as, even if they are secret and must not leave the system, they are found on several elements of the system. This replacement may be partial, for example only impact the list of the electronic devices, or the list of the readers, or else the list of the electronic devices and the list of the readers, or else a list of some readers and electronic devices and servers. In these cases, the list of the electronic devices, for example, no longer exists but is replaced by a shared key of electronic devices; the elements of the system will then have to use this shared key to communicate, thereby avoiding communicating with an element outside the system. These keys may be asymmetric: private key/public key system, the private key of the elements of a list being found on each of the elements registered on the list and the public key on each of the elements of the system able to enter into communication with the elements of said list, or symmetric, this same key being found both on the elements registered on said list and on the elements of the system able to communicate with the elements registered on said list. These keys may be updated regularly so as to avoid two recently updated elements from communicating with keys that could have been stolen. This update will be performed by the server, which, with knowledge of the public key of each electronic device and of each dual reader, will confidentially transmit to it the new shared keys. Be it by using security by lists or by shared keys, two elements of the system may thus be authorized to communicate with one another if they each have the public key corresponding to a private key located on the other element, this private key being either unique and positioned only on the element or shared by various elements of the system and then located on several elements of the system. Elements of the system may also communicate with one another if they each know one and the same secret key shared between them or between them and other elements of the system.

In one exemplary implementation, the electronic devices and readers no longer contain lists of public keys of electronic devices and their IDs and of dual readers, but only one key shared by the dual readers and another key shared by the electronic devices. Each electronic device and each dual reader also has a private key, but only the servers have the list of their associated public keys. The servers may then change and update said shared keys.

In another exemplary implementation, the presence of shared keys of dual readers makes it possible to avoid the requirement for lists of public keys of the readers and their IDs on each electronic device.

In another exemplary implementation, the presence of shared keys of electronic devices makes it possible to avoid the requirement for lists of public keys of the electronic devices on each dual reader.

Security of Peripherals

Peripherals attached and used by the readers are preferably secured so that the information provided to the peripheral may be trusted or so that the information provided by the reader to the peripheral may remain secure. The peripherals may therefore preferably be collectively or individually registered with the server that will be able to ascertain to the reader that such connected device is trustable. The accreditation procedure may include the verification that the peripheral contains a private keys the associated public key being known to the server and allowing the creation of a shared key to be used for later communication between the reader and the peripheral.

Additional Security

Other security measures may be introduced, including:
associating the electronic device with a user, provided in the electronic device or to the servers,
the requirement for the holder of the electronic device(s) to identify themselves in order to confirm a transaction, for example by entering a PIN code or by using a biometric device before placing the electronic device next to the dual reader. These identification means may be situated indiscriminately on the dual reader or on the electronic devices, or even accessible to the dual reader through the apparatus to which it is able to be connected. The dual reader or the electronic devices may therefore include means for identifying the user, these means being able to be biometric.
the addition of buttons or biometric device to the electronic device for confirming the transactions or entering a PIN,
the addition of screens to the electronic devices for displaying messages, files or amounts.
the addition of attributes to the files such as validity dates

DETAILED DESCRIPTION OF THE FIGURES

The invention will be able to be better understood upon reading the following detailed description of exemplary nonlimiting modes of implementation thereof and upon examining the appended drawing, in which:

FIG. 1 schematically shows an exemplary system for implementing the invention, FIG. 2 is a block diagram illustrating various steps of an exemplary data exchange method according to the invention, FIG. 3 is a view analogous to FIG. 2 of a variant implementation of the invention, FIG. 4 is an example of the timing of data flows between an electronic device according to the invention and third-party software connected to the server, FIG. 5 illustrates various steps able to be implemented for synchronizing data between an electronic device according to the invention and a server, FIG. 6 shows various steps able to be implemented for updating the lists and keys of an electronic device or of a reader, FIG. 7 shows various steps able to be implemented for updating the software of an electronic device or of a reader, and FIG. 8 shows various steps able to be implemented for synchronizing the readers with the servers.

This system includes a dual reader 10 according to the invention, configured to exchange information with two electronic devices 20A and 20B according to the invention, in the format of credit cards in the example illustrated.

The dual reader 10 and the electronic devices 20A and 20B may exchange information with at least one remote server 30, via for example an Internet or radio link, and by way, where applicable, of an ancillary device such as a microcomputer 40 or a mobile telephone 41.

Figure 1:
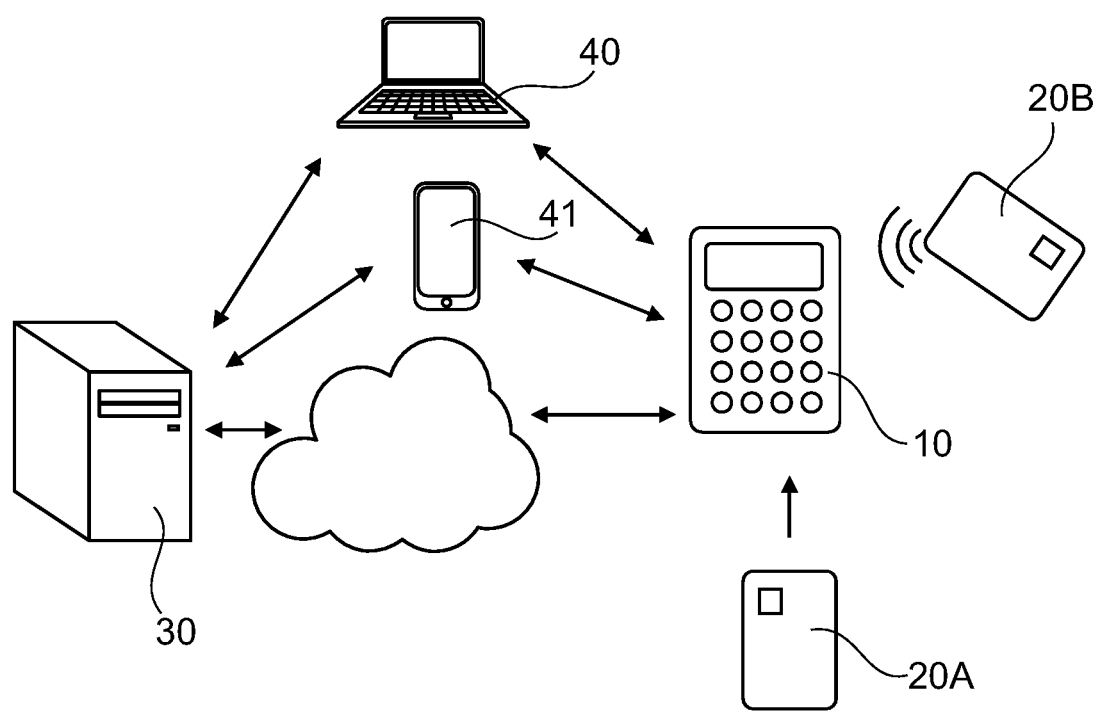
FIG. 1 illustrates an exemplary system for implementing a method according to the invention.
Figure 2:
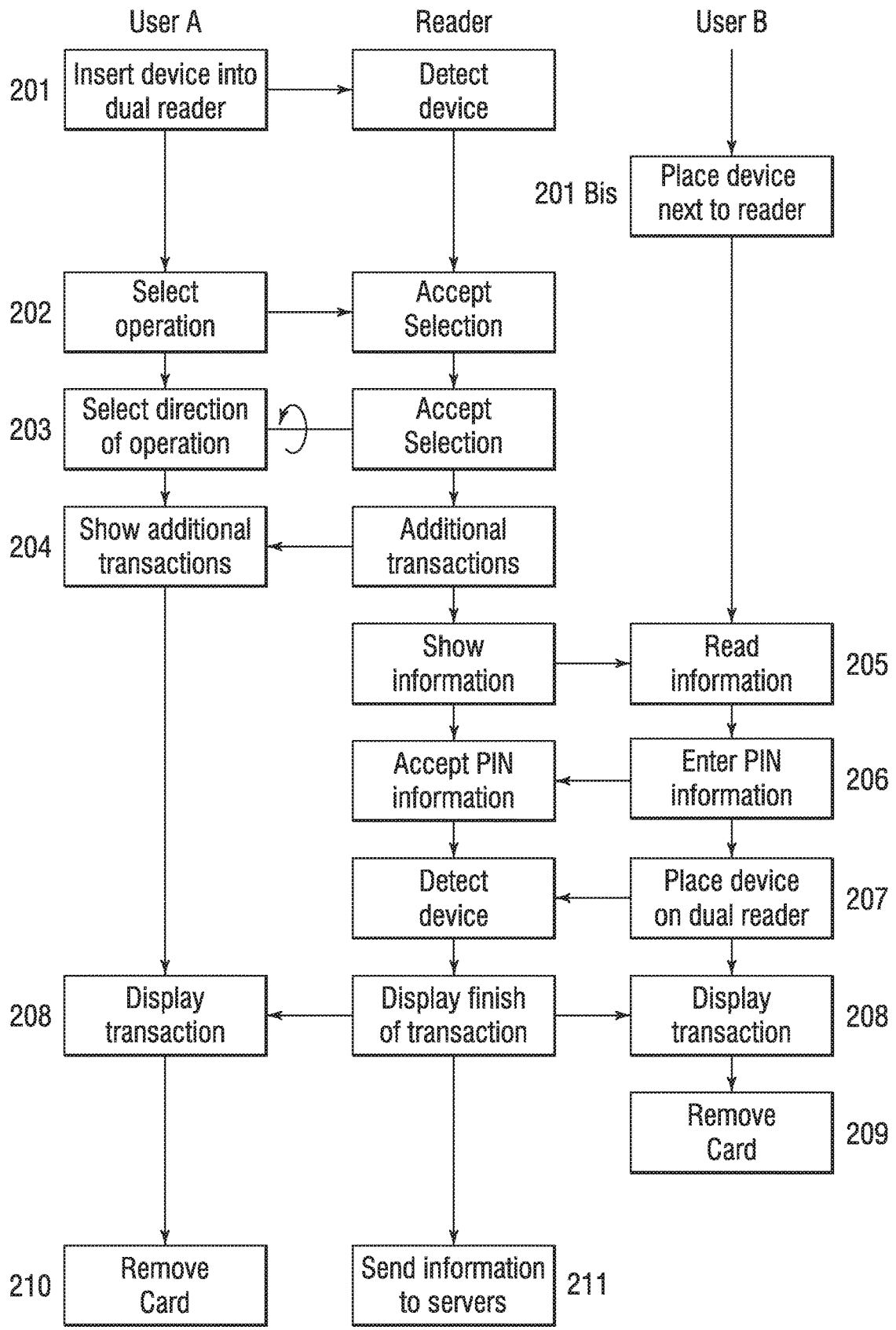

A description will now be given, with reference to FIG. 2, of the steps of an exemplary method according to the invention for performing a transaction between two electronic devices 20A and 20B. This transaction is said to be synchronous in this example as the electronic devices 20A and 20B have to be connected simultaneously to the dual reader 10 so that the transaction is able to take place; the first secure connection and the second secure connection overlap in time; the first connection may be contact-based and the second one may be contactless.

The transaction thus takes place between a first user A, having the first electronic device 20A according to the invention, and a second user B having the second electronic device 20B according to the invention.

The user A begins, in a step 201, by inserting his electronic device 20A into the dual reader. The user B may possibly place his electronic device next to the reader in step

201b is, in order to inform the reader of the nature of the files and amounts that are contained therein.

In a step 202, the user A selects the operation that he wishes to perform, for example: Make a transaction/balance or balance-balance; the latter choices corresponds to displaying the balance of the two devices 20A and 20B.

Next, in step 203, he selects the direction (send or receive), the file or the amount of the transaction; and where applicable provides the amount, that is to say the quantity in the case of a financial transaction.

Step 203 may be repeated if several transactions are linked, that is to say that the exchange has to consist of several files or amounts that are sent or received simultaneously.

In step 204, some additional transactions may also be automatically generated if the initial selected transactions require so; for instance the transferred documents may be associated to a price and may require that a payment matching their value be generated upon their transfer, or conversely the payment of an amount may be set on the receiving device to generate a receipt; such automatically generated transactions are shown to the user; he possibly enters his PIN (personal identification number) code in order to confirm the operation, or just validate the automatically generated transactions if any.

The user B, in step 205, may read, on the screen of the dual reader 10, an item of information offering him the transaction or to find out his balance.

He may input a PIN code in step 206 if the operation requires this, and then, in step 207, place his electronic device 20B on the dual reader 10 in order to perform the transaction. If some transactions are reported on the device B to require some automatically generated transactions to be effected and which are not yet on the list of transactions to be validated, such automatic transactions are generated and the process resumes at step 204

In a step 208, the reader displays that the transaction has finished.

The user B may then remove his card in step 209, and the user A may do the same in step 210.

In step 211, the reader sends the information relating to the exchange to the servers.

In the case of grouped transactions, one and the same code may be assigned to each of the transactions. The transactions are registered firstly on the first electronic device, but identified as 'conditional' and associated with the code. The conditionality allows the system to take into account debits written to the electronic device but not credits, which will be taken into account only when the conditionality has been removed. Then, the transactions are registered on the second device, also conditionally, and associated with the same code; but in this case none of the transactions or only the debiting transactions could be taken into account for as long as the conditionality is not removed. Said conditionality may be removed at the end of writing by the writing, to the second device, within a reasonable time that is parameterized in the system, of a new line called conditionality removal line. This last line, once transmitted to the reader, will be transmitted to the first device and this single line, registered on the first electronic device, will remove the conditionality of the transactions associated with the same code on this device. The instruction will thereafter be communicated to the servers. If the removal of conditionality is not registered within the reasonable time on the second electronic device, the reader will create, during this reading of the second card, or during a rereading of the first card, or later, a write operation canceling the grouped transaction. This write operation will be communicated to the first device if it has not already received it, or to the second device if it has not already received it, and to the servers. All of the debit or credit transactions associated with this code will then be canceled. The servers may thereafter take responsibility for preparing the instructions to delete these transactions written to the two electronic devices.

The transfer of a file or of an amount present in the system may also be constrained by other rules attached to said files and amounts, such as for example making their transfer conditional upon the transfer of a copy of an identity card, which is itself possibly conditional upon biometric identification of the holder of the electronic device. The transfer constraint may also, for example, for an invoice issued by a trader, be the reciprocal transfer of money corresponding to the sum of the invoice or else the transfer of carbon emission credits required by a law when purchasing an object.

Figure 3:
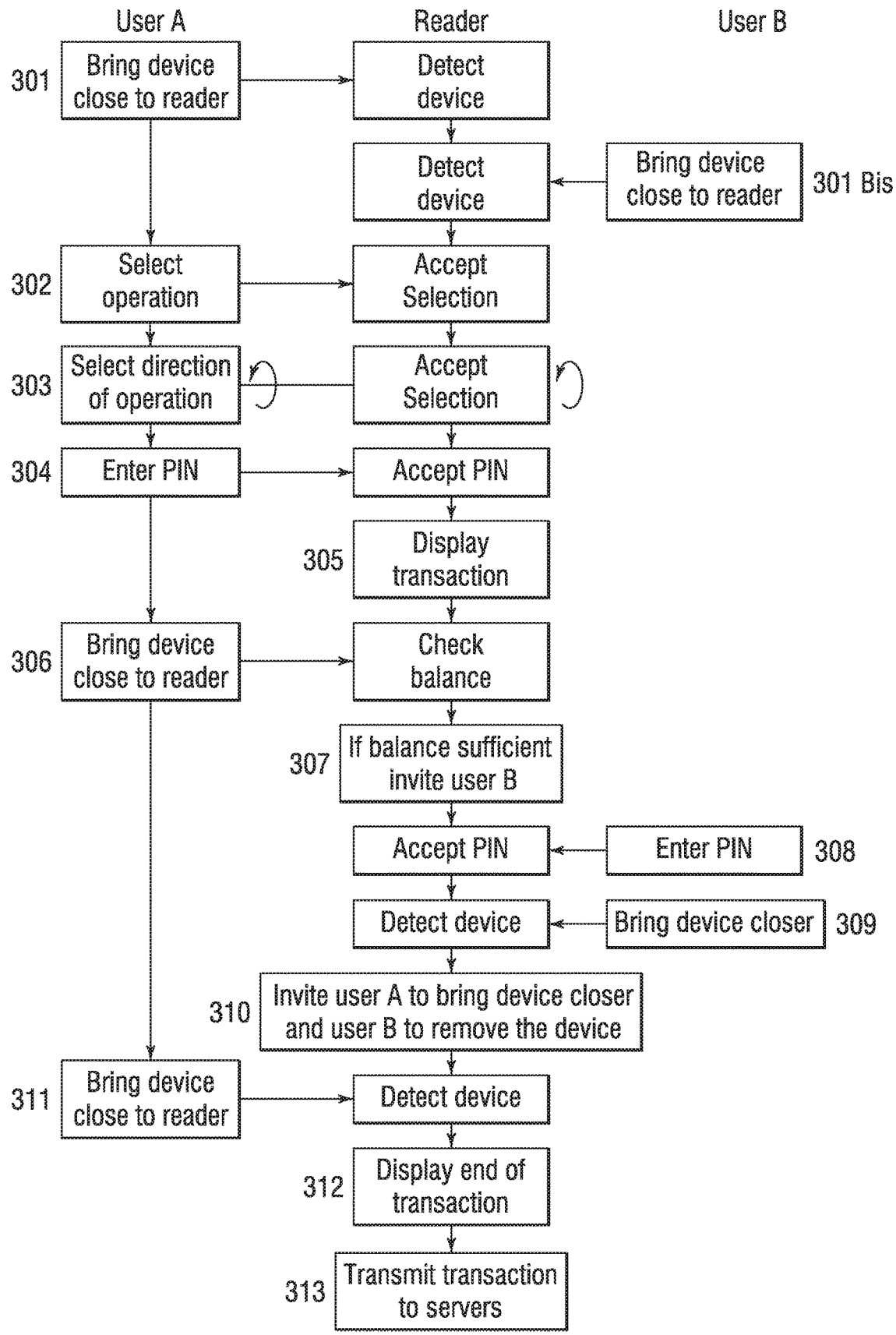

A description will now be given with reference to FIG. 3 of one variant implementation of the invention, in the case of an asynchronous transaction.

The user A begins, in a step 301, by bringing his electronic device 20A close to the dual reader 10; the user B does the same in step 301*bis*. These operations are used to transmit, to the reader, the list of the files and amounts contained in each electronic device that is placed next thereto; they may be omitted if the reader, depending on its configuration, is able to dispense with knowing the files and amounts able to be transferred on the electronic devices.

In a step 302, the user A selects the operation that he wishes to perform, for example: Make a transaction/balance or balance-balance, the latter choice corresponding to displaying the amounts available on the two devices 20A and 20B.

Next, in step 303, he selects the direction (send or receive), the file or the sum of the transaction.

Step 303 may be repeated if several transactions are linked.

In a step 304, the user A may enter his PIN code in order to confirm the operation.

The transactions are then prepared by the dual reader 10 with an 'unknown' counterpart.

In step 305, the dual reader displays the proposed transaction and invites the user A to bring his card close.

In step 306, the user A brings his device, for example in card form, close. All of the debit transactions are verified so that each available amount to be debited on this electronic device is at least equal to the sum to be debited and any credited amount will not exceed its maximum. The reader makes a copy of the previous transactions linking the files and amounts to be debited from this electronic device to files and amounts that have already been registered on an electronic device by the servers. If one or more available amounts are not sufficient, the operation is canceled; in the opposite case, in step 307, the user B is possibly invited to enter his PIN code and to bring his device close.

In step 308, the user B enters his PIN code.

In step 309, the user B brings his device 20B, for example in card form, close. All of the debit transactions are verified so that each available amount to be debited on this device is at least equal to the sum to be debited. If one or more available amounts are not enough, a write operation of canceling the transaction is generated and registered on this device. In the opposite case, the transactions are registered there. The previous transactions, collected in step 306 on the device 20A, are copied to the electronic device 20B. Thus, the item of information relating to the exchange includes information relating to previous exchanges relating to one and the same register or one and the same file. The reader makes a copy of the previous transactions linking the files and amounts to be debited from this electronic device 20B to files and amounts that have already been registered on an electronic device by the servers. The registrations and copies are sanctioned by the writing of an instruction to confirm the transaction, which makes these transactions valid on the device 20B.

In step 310, the user B is invited to remove his device and the user A is invited to bring his device close.

In step 311, the user A brings his device close. The confirmation or invalidation instruction is transmitted to the electronic device 20A. The transactions written to this device 20A are updated at the same time with the finally known identity of the device 20B. The previous transactions, collected in step 309, are copied to the electronic device 20A. If this step 311 is omitted, these operations will be performed subsequently during another synchronization with the servers, after these have received the confirmation instruction that will have been communicated to them by the same reader, or by another reader with which the device 20B will have communicated subsequently.

In step 312, the reader displays that the transaction has finished and invites the user A to remove his device.

In step 313, the transactions and confirmation instructions generated during this exchange are transmitted to the servers along with the transactions copied from the devices 20A and 20B in steps 306 and 309.

Figure 4:
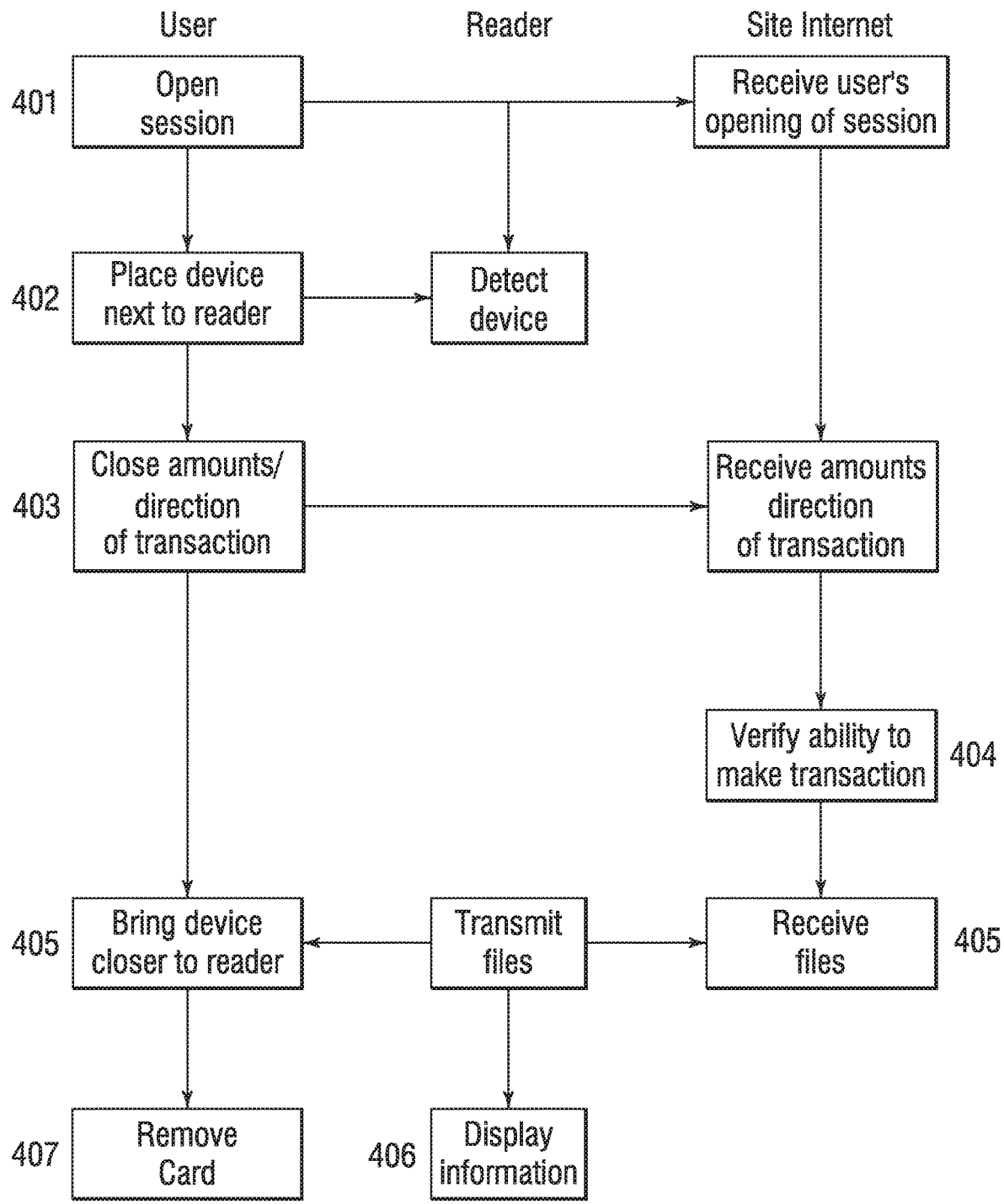

FIG. 4 illustrates an example of a data exchange between a user, the associated electronic device, and an external website controlling the insertion (credit) or the removal (debit) of a file or the variation in an amount, assigned to an electronic device, of the system.

The electronic device 20A or 20B is for example in credit card format. It may communicate with a server by way of a dual reader 10 or of a computer or telephone. The user may communicate with a website that itself communicates with the server 30.

In step 401, the user opens a session with the third-party site.

Figure 5:
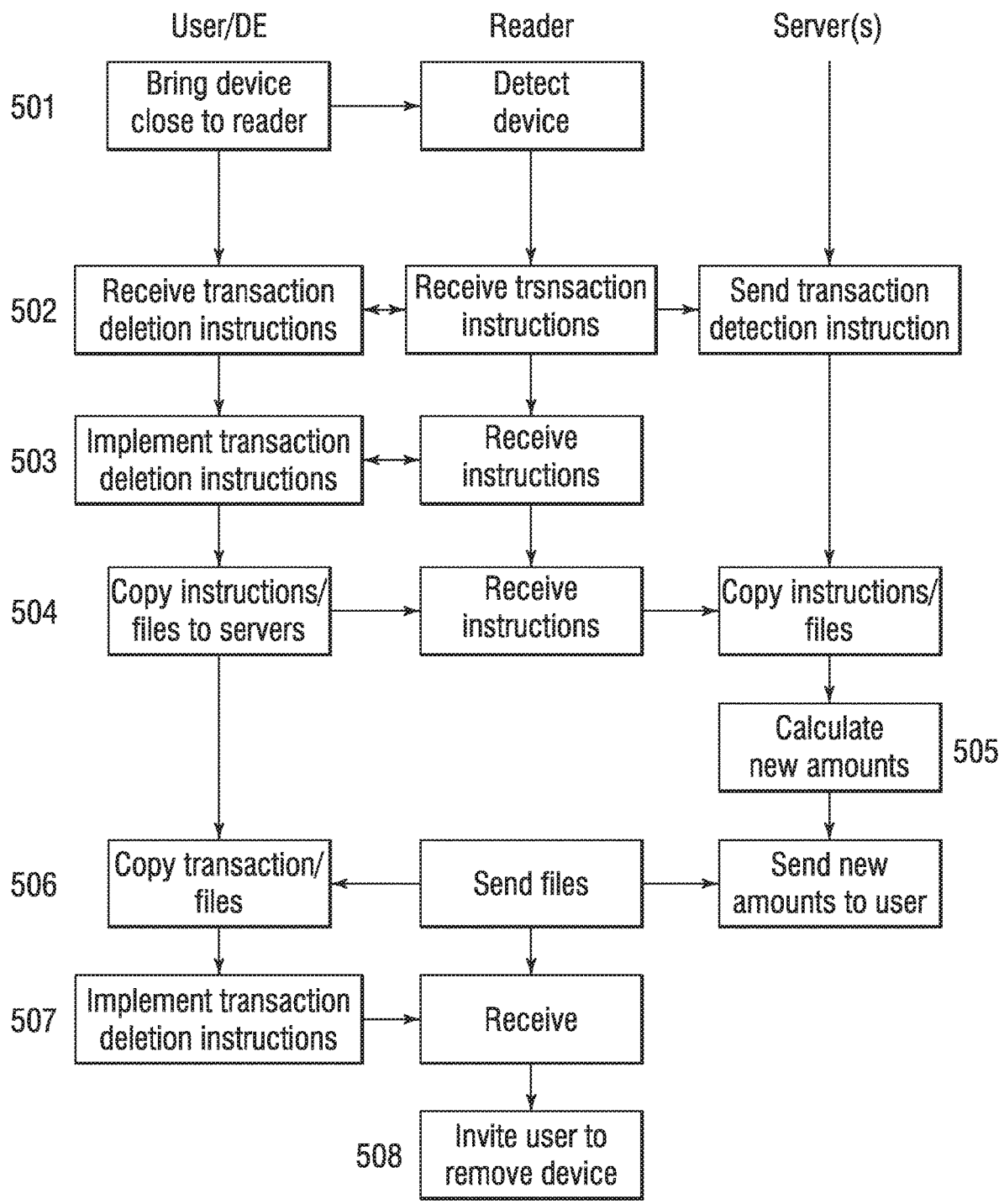

In step 402, the user possibly places the electronic device 20A next to the reader. Said reader, being connected to the server, synchronizes the device 20A and the server 30. The amounts are updated depending on the latest transactions, as illustrated in FIG. 5. This step may not be necessary if the transfer does not involve the transfer of a file or of an amount from the device to the third-party site.

In step 403, the user chooses the files or amounts and the direction of the transaction on the third-party site, to be transferred to or from said site. The instructions to update the balances of the electronic device are prepared.

In step 404, the third-party site verifies that it is able to make the transaction. It may for example provisionally debit the user's bank account and then send, to the server, the possible files, and lastly display the transaction and offer the user to confirm it by bringing his electronic device 20A close to the reader, or by clicking on an icon if the electronic device 20A is already communicating with the server.

In step 405, the user brings his electronic device 20A close to the reader 10 or presses the icon. The instructions to update the amounts are then written to the device 20A. The files that are possibly transmitted from the third-party site in step 404 are copied to the device 20A and possibly to the servers of the system. If this step does not take place within a reasonable time, the transaction is canceled and the third-party site is informed of this and the possible files transmitted in step 404 are deleted from the servers and from the device 20A. In the opposite case, the third-party site is informed that the operation is successful. The files transmitted from the device 20A to the third-party site are effectively transmitted from the server to the third-party site, and are possibly deleted from the servers; an instruction to delete said files from the device 20A is then generated.

In step 406, the reader displays that the transaction has ended and invites the user to remove his device 20A.

In step 407, the user removes his device 20A.

FIG. 5 illustrates examples of synchronization exchanges able to take place between an electronic device, for example in credit card format, and a server. This exchange takes place when the electronic device communicates with the reader and the reader communicates with the server. It therefore requires only the insertion of the card 20A into the reader or placing thereof next to the reader for the necessary time. The steps below describe the exchanges between the electronic device 20A and the server 30, through the reader 10.

In step 501, the user brings his electronic device 20A close to the reader.

In step 502, the server 30 possibly sends, to the device 20A, the transaction deletion instructions that it had already prepared.

In step 503, all of the transaction deletion instructions present on the electronic device 20A are implemented.

In step 504, all of the instructions, transactions and files that are present on the device 20A but not present on the servers are copied to the servers through the server 10.

In step 505, the server calculates, or gets calculated by one of the servers of the system, the new amounts, and prepares the lists of transactions to be copied to, or deleted from, the device 20A.

In step 506, all of the deletion instructions, transactions, files and new amounts that are present on the servers 30 but not present on the electronic device 20A but that should be, or that are calculated in step 505, are copied to the electronic device 20A.

In step 507, all of the transaction deletion instructions present on the electronic device 20A are implemented.

In step 508, the user is invited to remove his electronic device.

Figure 6:
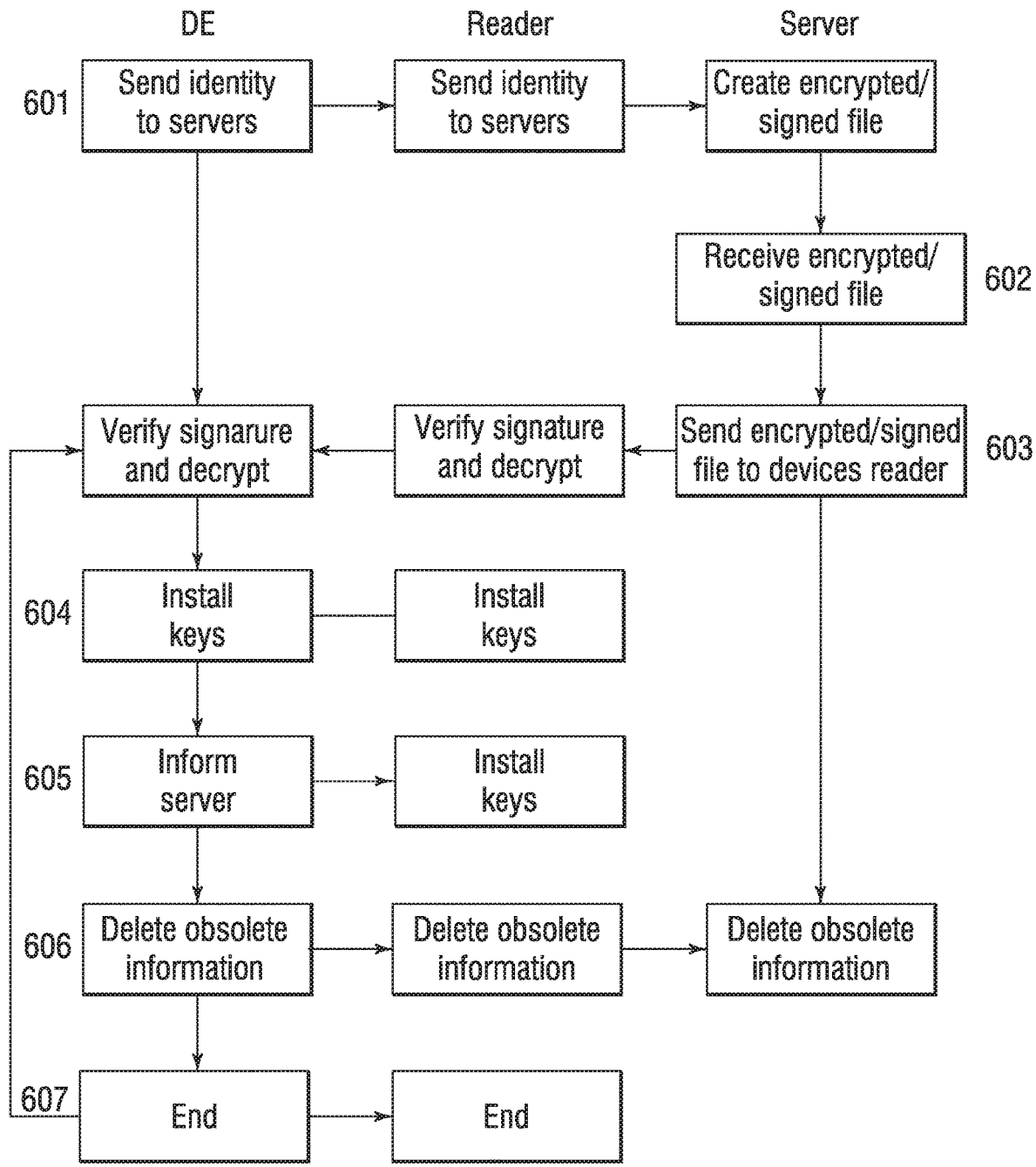

FIG. 6 shows an exemplary organization of the updating of the keys and of the lists of keys that are present on the readers or the electronic devices.

This figure assumes that the electronic device (DE) and a reader are present, but the following steps also apply to the synchronization of just the reader.

In step 601, the electronic device or the reader sends its identity to the server.

The server prepares, encrypts and signs:
a. the updating of the keys,
b. the updating of the lists of keys, so that only the electronic device or the reader is able to read them. It signs the encrypted files with one of its keys of which it knows that the private key is present on the electronic device or the reader. These update files contain information regarding the elements to be deleted, to be replaced and to be added. They may be divided into several files so as to allow updating in steps.

In step 602, the encrypted and signed file is sent to the electronic device or the reader.

In step 603, the electronic device or the reader verifies the signature of the file and decrypts it.

In step 604, the electronic device or the reader installs the keys and lists of keys in its internal memory provided for this purpose, and then triggers the taking into account of this update.

In step 605, the device or the reader informs the server of the taking into account of the update file.

In step 606, the electronic device or the reader deletes, from its memory, the obsolete information.

Figure 7:
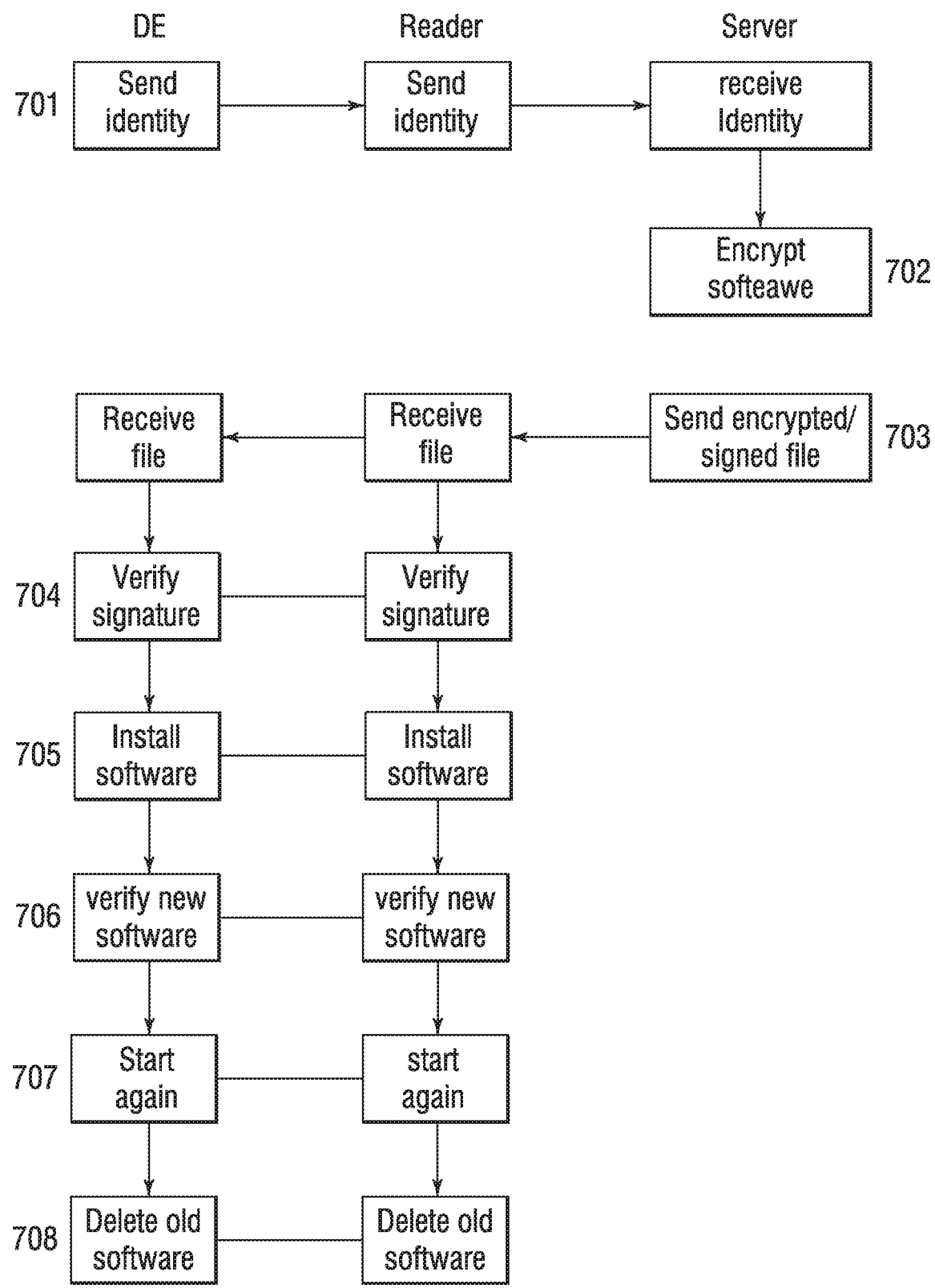

FIG. 7 shows an exemplary implementation of the updating of the software of the reader or of the electronic device.

This figure assumes that the electronic device (DE) and a reader are present, but the following steps also apply to the synchronization of just the reader.

In step 701, the electronic device or the reader sends its identity to the server.

In step 702, the server encrypts the software to be installed so that only the electronic device or the reader is able to read it. It also signs the thus encrypted file with one of its keys of which it knows that the public key is present on the electronic device or the reader.

In step 703, the encrypted and signed file is sent to the electronic device or the reader.

In step 704, the electronic device or the reader verifies the signature of the file and decrypts it.

In step 705, the electronic device or the reader installs the software in its internal memory provided for this purpose, without yet deleting the software that is already installed.

In step 706, the electronic device or the reader verifies that the new software has indeed been copied and changes the startup instruction of the electronic device (or the reader) so that said device, when it starts up again, starts up again using the new software.

In step 707, the electronic device or the reader is started up again.

Upon startup, in step 708, the old software of the electronic device or of the reader is deleted if it is still present there.

Figure 8:
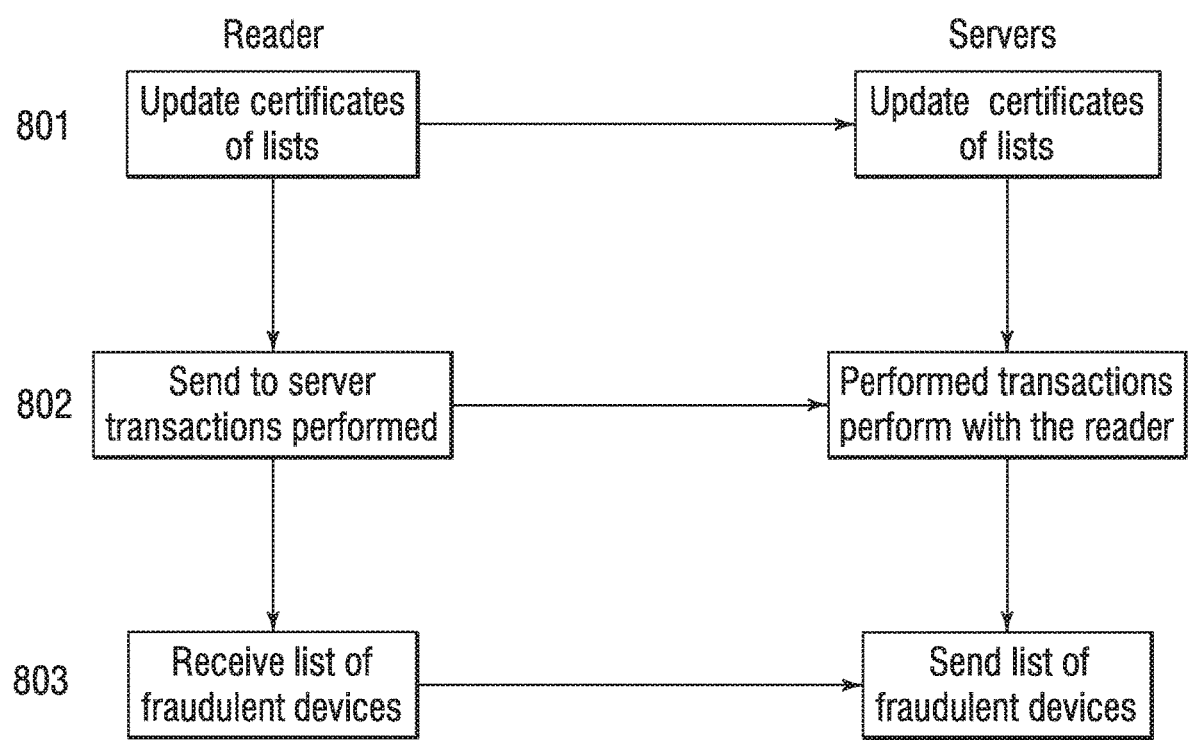

FIG. 8 describes an exemplary synchronization of the readers with the servers.

In step 801, the certificates and the lists are updated.

In step 802, there is sending to the server and then deletion of the transactions performed with the reader and stored thereon.

In step 803, there is possible reception of the list of the electronic devices to be marked as fraudulent or to be deactivated.

Figure 9:
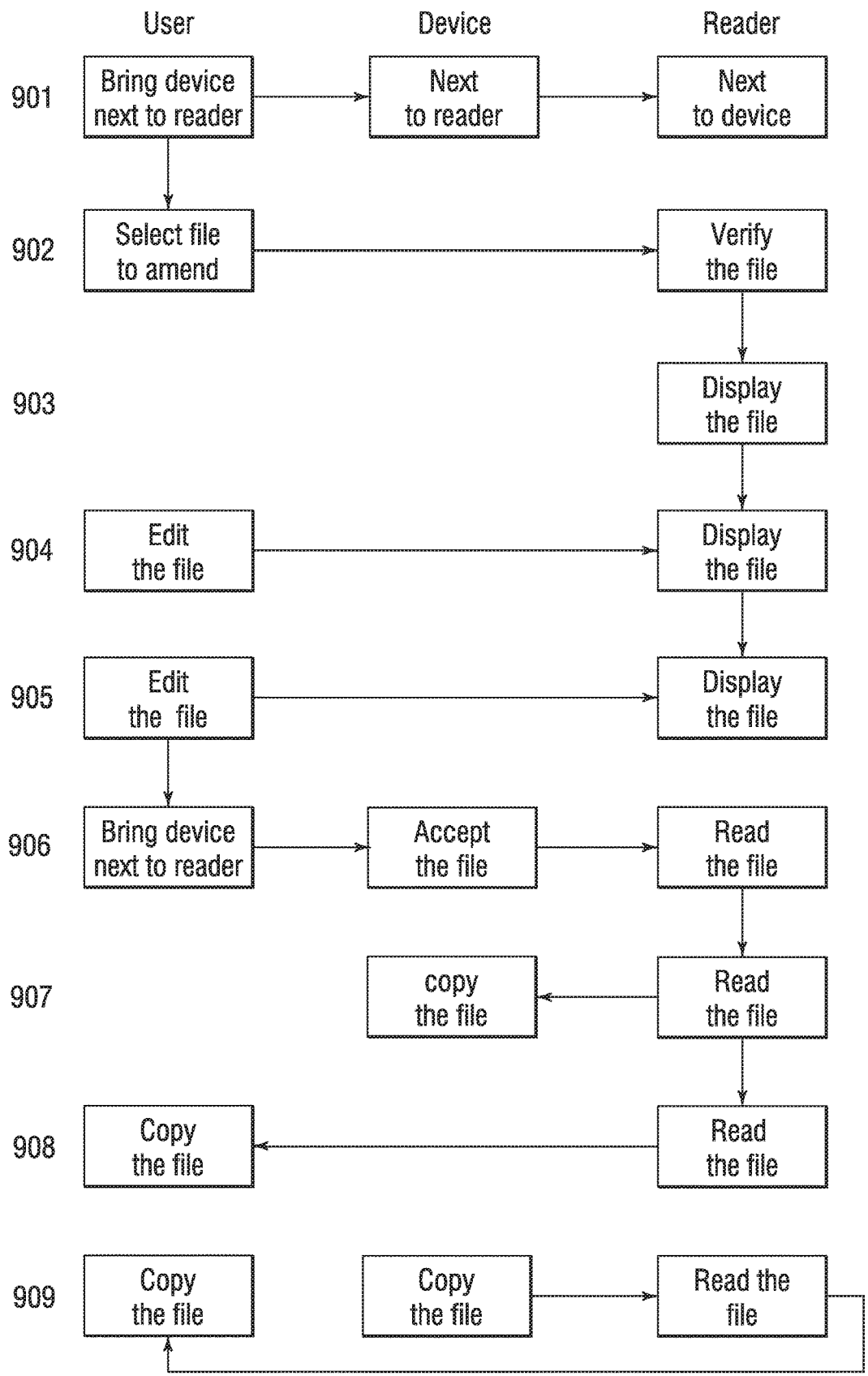
FIG. 9 shows the various steps able to be implemented by a user to create or amend a file on a secure device.

FIG. 9 shows the various steps able to be implemented by a user to create or amend a file on a secure device.

In Step 901 the user brings his secure device next to the reader

In step 902 the user selects the file he wants to amend or chooses 'Create New File' from the readers' menu In step 903, if the quantity associated to the file equals the maximum quantity allowed to be associated to the file, and the file has been marked as 'modifiable', the file is displayed on the reader and functions allowing its edition are activated. If the user did select 'Created New File' a blank file is displayed on the reader and functions allowing its editions are activated In step 904 the user edits the file In Step 905 the user can edit some of the characteristics of the file such as its minimum Quantity, Maximum Quantity, increment or other characteristics that have an influence on what can be done with the file within the system such as for instance 'can be transferred', or 'needs biometric device for viewing'. The quantity attached to the file is then set to its maximum allowed quantity'

In step 906 the user approaches again the device next to the reader.

In Step 907 the file is copied on the device

In step 908, to happen if the reader is connected to the server, or later when the reader gets connected to the server, the file is copied onto the server.

In Step 909 the card may also put a copy of the file on the server through a connection to the server with another reader.

The invention claimed is:

1. A method for performing at least one secure exchange within a system including first and second electronic devices and a dual reader including means for connection to each of the devices, and at least one server to which information relating to the exchange is able to be communicated, this method including:
   a) entering, into the dual reader, using its interface or an external apparatus that is connected thereto, an item of information relating to an exchange to be performed between the first and second devices,
   b) registering, in the first device, using the dual reader, an item of information relating to the exchange,
   c) registering, in the second device, an item of information relating to the exchange, and if not, canceling the exchange,
   d) transmitting the data relating to a transaction to said server,
   the dual reader being configured to connect to an external server, while the transaction is being performed between the two electronic devices, or outside of the transaction.

2. The method as claimed in claim 1, wherein a validity of a registration on the first device is conditional upon a registration, on the second device, of the item of information relating to the exchange; said validity of the registration on the first device being communicated, after the registration on the second device, to the first device by way of the dual reader, or subsequently by way of the server and then of another dual reader.

3. The method as claimed in claim 1, wherein the item of information relating to the exchange includes information relating to previous exchanges relating to one and the same register or one and the same file.

4. The method as claimed in claim 1, the server canceling a transaction recorded on the electronic devices if chaining of this transaction to any transaction gives rise to at least one rule associated with a transaction and parameterized in a server not being complied with.

5. The method as claimed in claim 1, wherein two elements of the system chosen from the electronic devices, the server(s) and the dual reader are authorized to communicate with one another if they each have a public key corresponding to a private key located on the other element, this private key being either unique and positioned only on said element or shared by other elements of the system.

6. The method as claimed in claim 1, the dual reader including a clock, the information registered in the first and second devices being timestamped with the time of the exchange.

7. The method as claimed in claim 1, wherein the dual reader performs transfer of amounts registered in a register of the first electronic device from or to a register of other electronic devices while ensuring that, at the end of each transfer, certain rules present in the dual reader at the time of the transfer are complied with for each of initial values of said registers incremented by amounts received from which values amounts sent have been deducted.

8. The method as claimed in claim 1, a first secure connection between the first device and the dual reader and a second secure connection between the second device and the dual reader being established before step a) and overlapping in time.

9. The method as claimed in claim 1, wherein before step a), the first device and/or the second device communicate information to the dual reader.

10. The method of claim 9, wherein said information relates to an inventory of documents recorded in the devices, so that the dual reader is able to incorporate them into a menu.

11. The method as claimed in claim 1, a first connection being contact-based and a second one being contactless.

12. The method as claimed in claim 1, a human-machine interface of the dual reader including a keypad for entering said item of information relating to the exchange.

13. The method as claimed in claim 1, a human-machine interface of the dual reader including a screen, the system being configured to display two messages intended for bearers of the first and second devices, respectively.

14. The method as claimed in claim 1, the electronic devices being in credit card or SIM card format.

15. The method as claimed in claim 1, the secure exchanges with the electronic devices taking place in different locations through two dual readers that are linked by a computer connection.

16. The method as claimed in claim 1, wherein two elements of the system chosen from the electronic devices, the server(s) and the dual reader are authorized to communicate with one another if they each know one and the same secret key shared between them, or between them and other elements of the system.

17. A system for implementing a method for performing at least one secure exchange within a system including first and second electronic devices and a dual reader including means for connection to each of the devices, and at least one server to which information relating to the exchange is able to be communicated, the method including:
a) entering, into the dual reader, using its interface or an external apparatus that is connected thereto, an item of information relating to an exchange to be performed between the first and second devices,
b) registering, in the first device, using the dual reader, an item of information relating to the exchange,
c) registering, in the second device, an item of information relating to the exchange, and if not canceling the exchange,
d) transmitting data relating to a transaction to said server, the dual reader being configured to connect to an external server, while the transaction is being performed between the two electronic devices, or outside of the transaction
the system including:
the dual reader,
two electronic devices,
the server,
the dual reader being configured to establish a first secure connection to the first device, establish a second secure connection to the second device, allow an item of information relating to the exchange to be performed between the first and second electronic devices to be entered, register in the first device an item of information relating to the exchange, register in the second device an item of information relating to the exchange, and then communicate the information relating to the exchange to the server.

18. The system as claimed in claim 17, the servers being accessible by connection to a data network, and allowing data synchronization of at least one of the electronic devices via a computer or a telephone.

19. The system as claimed in claim 17, the dual reader being configured to simultaneously allow contact-based communication with one of the electronic devices and contactless communication with the other electronic device.

20. The system as claimed in claim 17, the dual reader or the electronic devices including biometric means for identifying a user.

* * * * *